April 14, 1959     C. R. RASMUSSEN     2,881,899
ARTICLE TURNOVER DEVICE
Filed Jan. 28, 1957     3 Sheets-Sheet 1
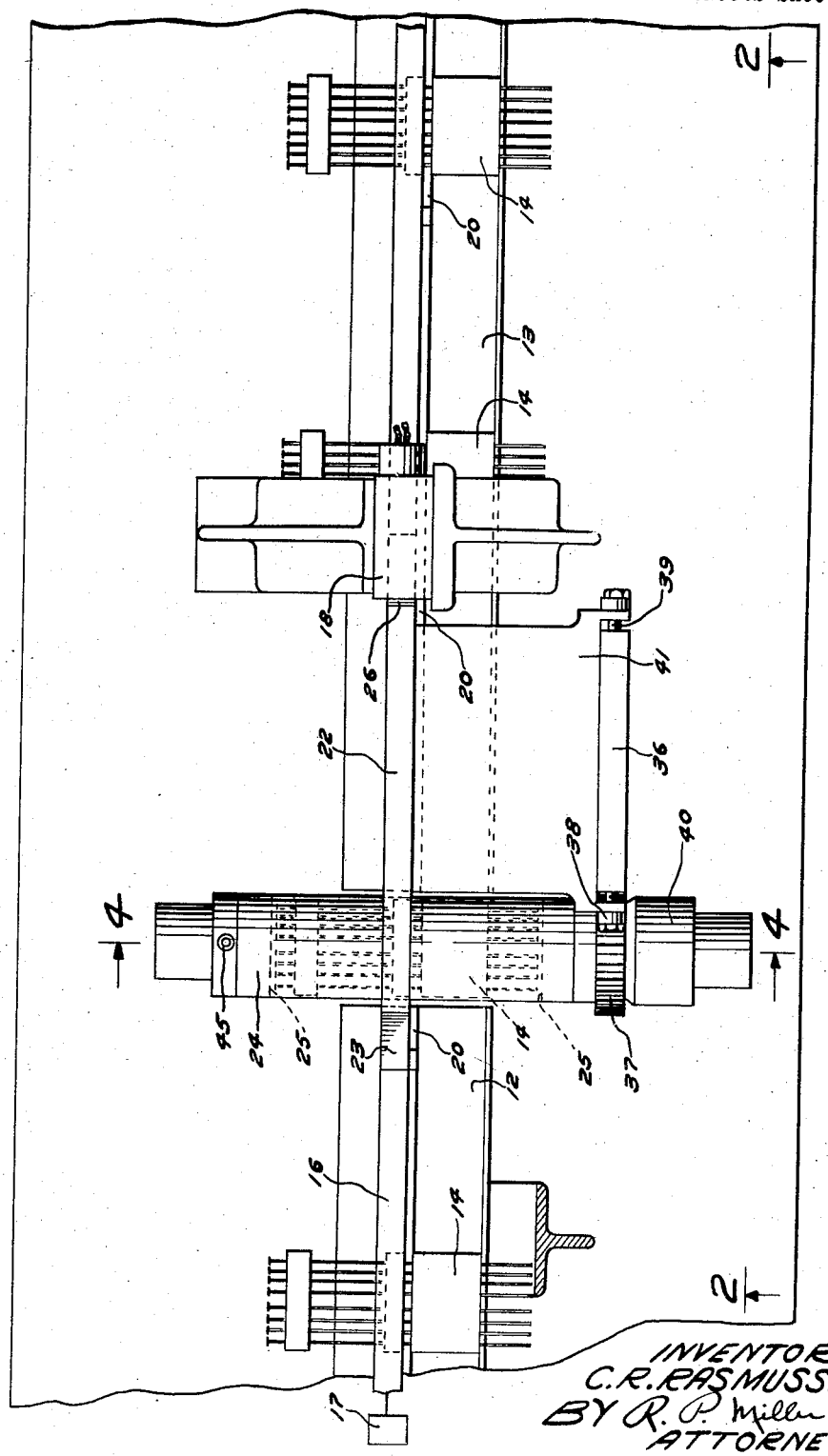
INVENTOR
C. R. RASMUSSEN
BY R. P. Miller
ATTORNEY

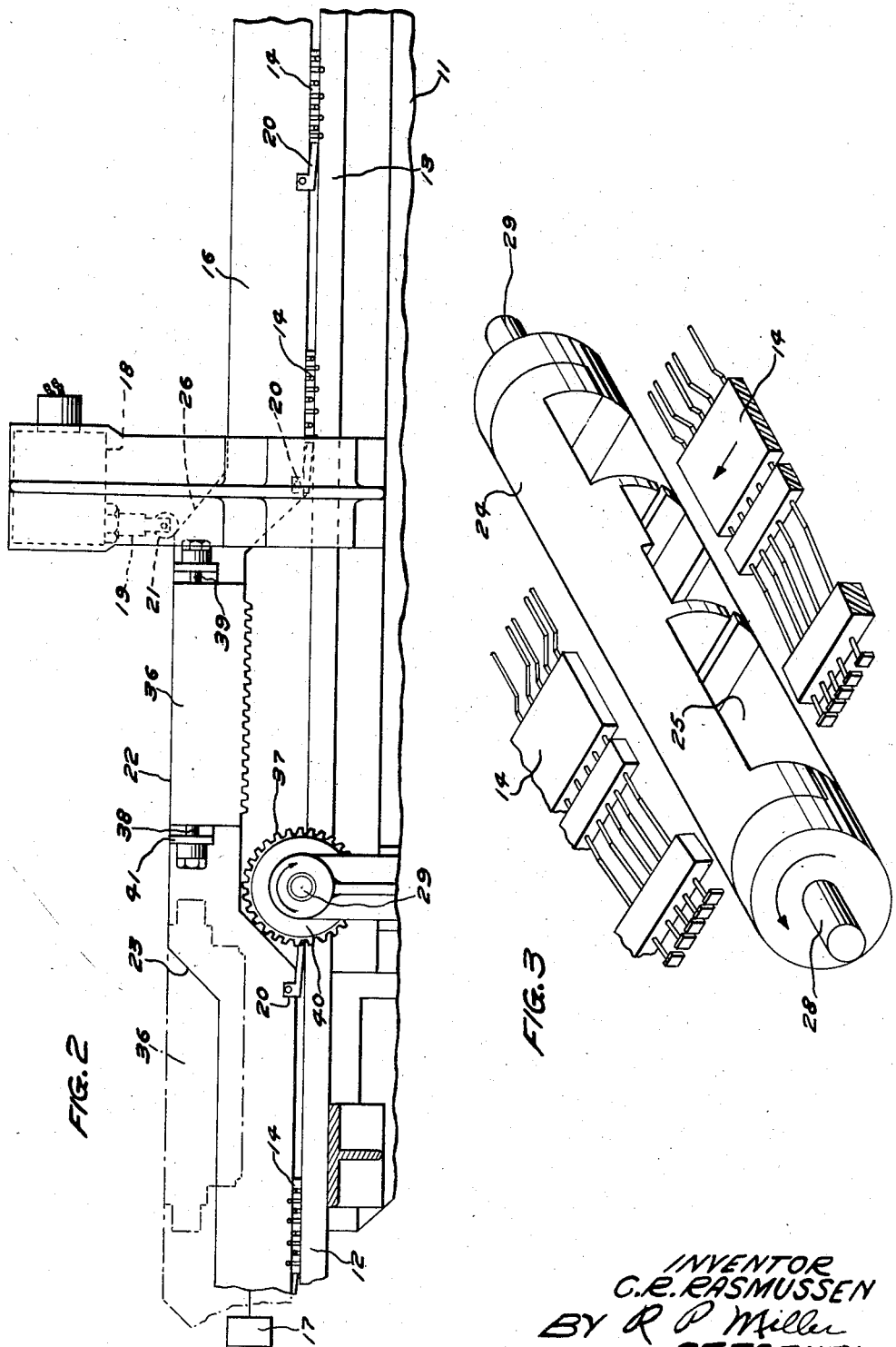

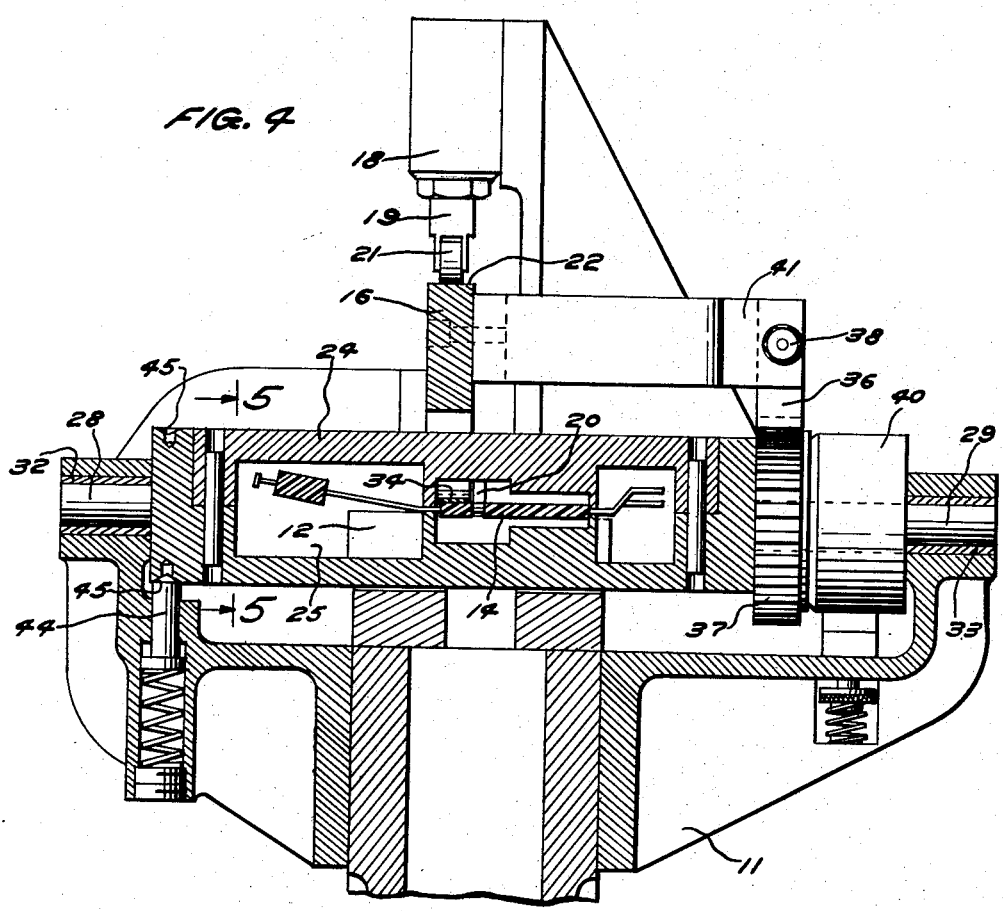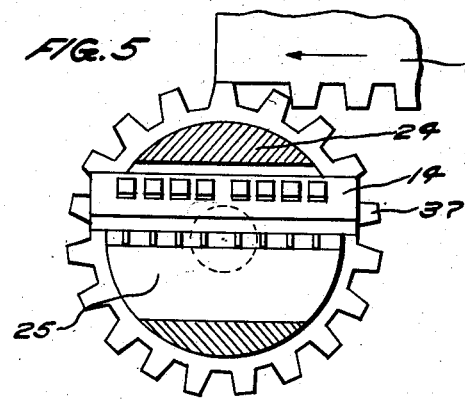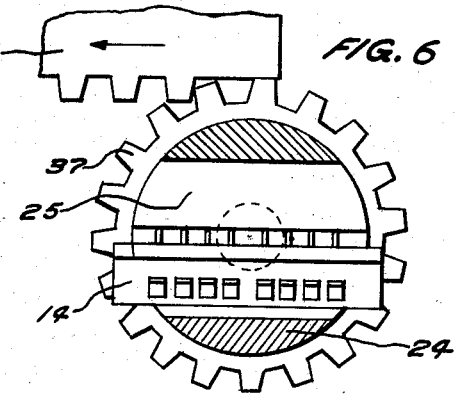

United States Patent Office 2,881,899
Patented Apr. 14, 1959

2,881,899

ARTICLE TURNOVER DEVICE

Clarence R. Rasmussen, La Grange, Ill., assignor to Western Electric Company, Incorporated, New York, N.Y., a corporation of New York Application January 28, 1957, Serial No. 636,779

8 Claims. (Cl. 198—33)

This invention relates to article handling devices, and more particularly to devices for turning over wire spring relay combs which are being advanced from one fabricating station to another.

In the fabrication of a work part, it is frequently desirable or necessary to perform operations on opposite sides of the part. This renders it necessary to turn the part over between operations. This is not a serious problem where the work part is manually moved from one operation to the next, but it is a problem when the work part is to be advanced automatically from one operation to another.

One object of this invention is to provide a device for automatically turning over work parts as they are moved from one fabricating station to another.

Another object of this invention is to provide a device for automatically turning over work parts traveling along a path without impeding the progress of the parts from one fabricating station to another.

A further object of this invention is to provide a transversely apertured rotatable member which receives a work part advanced by a transfer mechanism and which is rotated by the transfer mechanism through 180° to turn the work part over.

A still further object of this invention is to provide a device driven by a transfer mechanism for turning over wire spring relay combs positioned on and advanced by the transfer mechanism.

Still another object of this invention is to provide an automatic work part turnover device wherein a reciprocated transfer bar advances a work part into an apertured member on one stroke and rotates the member to turn over the work part on the other stroke.

With these and other objects in mind, the present invention contemplates a rotatable member having a transverse aperture aligned with a bed of a reciprocated transfer mechanism for receiving a wire spring relay comb advanced by the transfer mechanism from a first fabricating station toward a second fabricating station. A rack carried by the transfer mechanism meshes with a gear secured to a one-way clutch connected to the member for rotating it through 180° to turn the wire spring relay comb over, whereupon the transfer mechanism moves another comb into the aperture to force the turned over comb out of the aperture toward the second fabricating station.

Other objects and advantages of the invention will become apparent by reference to the following detailed description and the accompanying drawings illustrating a preferred embodiment thereof, in which Fig. 1 is a fragmentary plan view of a transfer mechanism for advancing work pieces to a turnover device embodying the principal features of the present invention;

Fig. 2 is a side view of the disclosure of Fig. 1 showing the rack carried by the transfer mechanism and the gear which the rack meshes with;

Fig. 3 is an enlarged perspective view of the transversely apertured, cylindrical member and fragments of wire spring relay combs showing the positions of the combs before and after being turned over;

Fig. 4 is a cross-sectional view taken on line 4—4 of Fig. 1 showing a wire spring relay comb in the aperture in the cylindrical member and also showing the spring loaded plunger which holds the cylindrical member between turnover operations;

Fig. 5 is an enlarged cross-sectional view taken on line 5—5 of Fig. 4 showing a fragment of the rack and a wire spring relay comb positioned in the cylindrical member before the turnover operation; and Fig. 6 is the disclosure of Fig. 5 after the turnover operation.

Referring now in detail to the drawings, a base 11 is shown supporting elongated beds 12 and 13 along which wire spring relay combs 14 of a well-known type are advanced from one fabricating station to another (not shown). A transfer bar 16 reciprocably mounted above the beds 12 and 13 and actuated by an air cylinder 17 is provided with a plurality of spaced pushers 20 which engage the wire spring relay combs 14 to advance them along the beds 12 and 13. The pushers 20 are pivotally secured to the transfer bar 16 whereby they ride over the wire spring relay combs 14 on the retract stroke of the transfer bar 16 and then drop to engage and move the combs on the feed stroke of the transfer bar 16. A limit switch 18 of a well-known type mounted above the base is provided with an actuating plunger 19 and a cam roller 21 and is electrically connected to a solenoid valve of a well-known type (not shown) which controls the operation of the air cylinder 17. The cam roller 21 engages a horizontal surface 22 and sloping surfaces 23 and 26 on the transfer bar 16 as it is moved. When the roller 21 moves downward a certain distance along surface 23 or 26 on the moving transfer bar 16, the switch 18 is closed to actuate the solenoid valve which then controls the air cylinder 17 to move the transfer bar 16 in the opposite direction. In this manner the transfer bar 16 is reciprocated.

A cylindrical member 24 having a transverse aperture 25 for receiving the wire combs 14 is provided with shafts 28 and 29 which are rotatably mounted in bushings 32 and 33 (Fig. 4) supported by the base 11. The member 24 is mounted between the beds 12 and 13 with the aperture 25 normally aligned with the beds, which are end to end with a space between the facing ends for the member 24. This arrangement permits movement of the combs 14 from the bed 12 into the aperture 25 in the member 24 and from the aperture 25 onto the bed 13, the combs 14 being sequentially moved into the aperture 25 by the pushers 20. A leaf spring 34 (Fig. 4) secured in the aperture 25 engages the comb 14 to hold it therein.

A rack 36, secured by set screws 38 and 39 to a bracket 41 carried by the reciprocated transfer bar 16, meshes with a gear 37 secured to a one-way clutch 40 of a well-known type which is mounted on the shaft 29 of the member 24. When the transfer bar 16 moves to the left (Figs. 1 and 2), the rack 36 rotates the gear 37 and actuates the clutch 40 to rotate the member 24 through 180°, thereby turning over the comb 14 positioned in the aperture 25 in the member 24. The set screws 38 and 39 can be adjusted to vary the time of the actuation of the member 24 relative to the stroke of the transfer bar 16. A conical end of a spring loaded plunger 44 (Fig. 4) enters conical recesses 45 spaced 180° apart in the member 24 to hold the member 24 between turnover operations. When the member 24 is rotated through 180°, the plunger 44 is cammed out of one recess 45 and rides along the surface of the member 24 until it reaches and enters the other recess 45. When the transfer bar 16 is moved to the right (Figs. 1 and 2), the rack 36 rotates the gear 37, but the clutch 40, being a one-way clutch, does not rotate the member 24. The pushers 20 engage the combs 14 to advance them as the transfer bar 16 is moved to the right, the foremost one of the advancing combs 14 engaging the turned over comb 14 in the aperture 25 to force it out onto the bed 13.

The turned over comb 14 on the bed 13 is then engaged and advanced by the pushers 20.

In operation of the device, wire spring relay combs 14 are advanced along the bed 12 by the pushers 20 each time the transfer bar 16 is moved to the right (Figs. 1 and 2). On each such feed stroke of the transfer bar 16, the foremost comb 14 on the bed 12 is moved into the aperture 25 in the member 24 to push a previously turned over comb 14 from the aperture 25 onto the bed 13. When the transfer bar 16 is moved to the left (Figs. 1 and 2) in its retract stroke, the rack 36 rotates the gear 37 and the clutch 40 is actuated to rotate the member 24 through 180° to turn over the comb 14 which is held in the aperture 25 in the member 24. On the next feed stroke, the turned over comb 14 is removed from the aperture 25 as above described and moved along the bed 13 by one of the pushers 20.

Thus, on each feed stroke of the transfer bar 16, a comb 14 is moved into the aperture 25 in the member 24 and on the retract stroke, the member 24 is rotated through 180° to turn over the comb 14 in the aperture 25. In this manner the combs 14 are moved along the bed 12 from one fabricating station and are sequentially turned over before being advanced along the bed 13 to a second fabricating station.

It is to be understood that the above-described arrangements are simply illustrative of an application of the principles of the invention. Numerous other arrangements may be readily devised by those skilled in the art which will embody the principles of the invention and fall within the spirit and scope thereof.

What is claimed is:

1. A device for turning over articles, comprising feed means, means for moving the feed means, means carried by the feed means for advancing an article along a predetermined path during one portion of movement of said feed means, a member movably mounted in said path and having an aperture aligned with the path for receiving the article advanced by said feed means, a resilient member secured in the aperture for engaging and holding the article and means actuated by the feed means during another portion of movement of said feed means for moving said engaging and holding means to turn over the article.

2. A device for turning over work parts being moved between fabricating stations, comprising a base, means on the base for feeding a work part along the base from one fabricating position to another, a member rotatably mounted on the base and having an aperture for receiving a work part, resilient means secured in the aperture for holding the article therein, and means actuated by the feeding means for rotating the member whereby the article in said aperture is turned over.

3. A device for rotating work parts, comprising a base, a member movably mounted on the base and having an aperture extending therethrough from one side of the member to the other for receiving and holding an article to be rotated, feed means mounted on the base and reciprocated in advance and retract strokes, means carried by the feed means for moving a work part along the base and into the aperture in the member on one of said strokes, resilient means in the aperture for retaining the work part therein and means actuated by the feed means on the other of said strokes for moving said receiving and holding means to rotate the work part and to alternately present said one side and said other side of the member to the work part moving means whereby alternate work parts are moved into said aperture from opposite sides of the member.

4. A device for turning over articles, comprising a base, feed means mounted on the base and reciprocated in advance and retract strokes, a member movably mounted on the base and having an aperture for receiving an article to be turned over, said aperture extending through the member from one side thereof to the other in such a manner that the turned over article therein is forced out of said aperture at one side of the member when another article is forced into the aperture from the other side of the member, resilient means in the aperture for retaining the article therein, means on the feed means for engaging an article on said advance stroke to move it along the base and into said aperture, and means actuated by the feed means on said retract stroke for moving the member to turn over the article therein.

5. A device for turning over work parts, comprising a base, a member rotatably mounted on the base and having an aperture for receiving a work part to be turned over, feed means reciprocably mounted on the base, means for reciprocating the feed means in advance and retract strokes, a pusher element mounted on the feed means for engaging a work part and moving it along the base and into the aperture in the member when said feed means is moved in its advance stroke, and a clutch secured to the member and actuated by the feed means on said retract stroke for rotating said member to turn over the work part in said aperture.

6. A device for turning over work parts, comprising a base, a member rotatably mounted on the base and having an aperture for receiving a work part to be turned over, a transfer bar reciprocably mounted on the base, means for reciprocating the transfer bar in advance and retract strokes, a plurality of spaced pusher elements carried by the transfer bar for engaging work parts and moving them along the base, one of said work parts entering the aperture in the member on each advance stroke, a clutch mounted on the member, means carried by the transfer bar for actuating the clutch on each retract stroke whereby the member is rotated to turn over the work part therein, and means mounted on the base and engaging the member to hold it between turnover operations.

7. A device for turning over work parts being fed from one fabricating station to another, comprising a base, an elongated first bed on the base, an elongated second bed on the base in spaced end-to-end relationship with the first bed, a member movably mounted between the spaced ends of the beds and having an aperture for receiving a work part to be turned over, means on the base for advancing work parts along the first bed at spaced intervals and into the aperture in the member one at a time, means actuated by the advancing means for rotating the member to turn over the work part therein, and means on the base for holding the member with its aperture in alignment with the beds after said member is rotated, said turned over work part being pushed out of said aperture onto the second bed by the next work part following it along the first bed, said advancing means also advancing the turned over work part along the second bed.

8. A device for turning over work parts being fed from one fabricating station to another, comprising a base, a first elongated bed on the base for supporting work parts, a second elongated bed on the base and in spaced alignment with the first bed, a transfer bar reciprocably mounted above the beds, means on the base for reciprocating the transfer bar, a plurality of pusher elements pivotally secured to the transfer bar and extending toward the beds for advancing work parts along the beds as the transfer bar is moved in one direction, said pusher elements riding over the work parts on the beds as said transfer bar is moved in the other direction, a member rotatably mounted on the base between the first and second beds and having an aperture normally aligned with the beds for receiving one at a time work parts fed from the first bed, a one way clutch mounted on the member, a gear secured to the clutch, a rack carried by the transfer bar and meshing with the gear whereby when the transfer bar moves in said other direction the member is rotated through one half revolution to turn over the work part in said aperture, and means on the base for holding the member with its aperture in alignment with the beds after said member has been rotated through said one half revolution.

References Cited in the file of this patent

UNITED STATES PATENTS

| | | |
|---|---|---|
| 1,594,326 | Richter | July 27, 1926 |
| 2,623,627 | MacLennan | Dec. 30, 1952 |

FOREIGN PATENTS

| | | |
|---|---|---|
| 445,035 | Germany | June 2, 1927 |